UNITED STATES PATENT OFFICE.

JOSEPH KOETSCHET, OF ST. FONS, NEAR LYONS, FRANCE, ASSIGNOR TO SOCIÉTÉ CHIMIQUE DES USINES DU RHÔNE, ANCIENNEMENT GILLIARD, P. MONNET ET CARTIER, OF LYONS, FRANCE, A CORPORATION OF FRANCE.

ORTHO-SULFONATED TOLUYLIC ALDEHYDE AND PROCESS OF MAKING SAME.

SPECIFICATION forming part of Letters Patent No. 709,159, dated September 16, 1902.

Application filed June 18, 1901. Serial No. 65,049. (No specimens.)

*To all whom it may concern:*

Be it known that I, JOSEPH KOETSCHET, chemist at the works of Société Chimique des Usines du Rhône, anciennement Gilliard, P. Monnet et Cartier, of St. Fons, near Lyons, France, have invented certain new and useful Improvements in the Manufacture of Sulfonated Aldehydes, of which the following is a specification.

The present invention relates to the manufacture of ortho-sulfonated derivatives of toluylic aldehyde, more especially suitable for employment in the manufacture of coloring-matters and dyestuffs.

When benzoic aldehyde is treated with sulfuric acid, it is transformed substantially into the meta-sulfonic acid of benzoic aldehyde, and it has been impossible to manufacture by direct sulfonation the ortho derivative, which possesses very valuable properties, particularly the property of yielding coloring-matters very fast to alkalies on condensation with aromatic amins. I have now studied the action of sulfonating agents on meta-toluylic aldehyde and have discovered that this aldehyde comports itself toward sulfonating agents differently from benzoic aldehyde and that ortho-sulfonated derivatives of meta-toluylic aldehyde may be readily obtained by direct sulfonation. I have further discovered that the sulfonated meta-toluylic aldehyde thus obtained possesses analogous properties to ortho-sulfo-benzoic aldehyde, notably in yielding with aromatic amins—such, for example, dimethylanilin and ethyl-benzyl-anilin or their substitution derivatives—such as, for example, ethyl-benzyl-anilin sulfonic acid—bluish-green coloring-matters of great value being dyestuffs fast to alkalies. The sulfonated meta-toluylic aldehyde obtained according to my invention has the composition $C_8H_8SO_4$. It is an acid crystalline substance exceedingly soluble in water and combines with alkalies and alkali earths to form neutral salts also soluble in water. Its dry sodium salt when acted upon by phosphorous pentachlorid yields a chlorin derivative insoluble in water, which can be recrystallized from alcohol and which melts at about 109° centigrade.

The sulfonation of meta-toluylic aldehyde may conveniently be carried out according to the following example, in which sulfuric acid containing sixty per cent. anhydride is employed as sulfonating agent at a low temperature, under which conditions the ortho-monosulfonic acid is the main product; but the invention is not limited to the employment of the sulfonating agent nor to the temperature or other conditions mentioned in the example.

*Example of the preparation of sulfonated meta-toluyl-aldehyde.*—One part, by weight, of meta-toluylic aldehyde is run slowly into ten parts, by weight, of sulfuric acid containing sixty per cent. anhydride previously cooled to 0° centigrade. The temperature of the mixture is maintained between 0° and 5° centigrade during the mixing, and the mixture is then allowed to stand several hours to allow the reaction to be completed, the temperature finally rising to about 20° or 25° centigrade, or the temperature may be kept between 0° and 5° centigrade until the complete solubility of a test in water shows the reaction to be completed. The product of the reaction is then poured upon ice, when an aqueous solution is obtained. The excess of sulfuric acid may be removed and the sulfonated meta-toluylic aldehyde obtained in the form of its barium salt by neutralization of the solution with carbonate of barium. After filtering off the barium sulfate formed by the excess of sulfuric acid the barium salt of the sulfonated meta-toluylic aldehyde may be isolated by evaporation of the filtrate and purified by recrystallization of the barium salt, which is a white powder easily soluble in hot water, less soluble in cold water, and crystallizes in needles. The solution of this salt gives with phenylhydrazin a precipitate characteristic of aldehydes. From the barium salt other salts or free sulfonic acid may be prepared. The ortho-sulfonated meta-toluylic aldehyde being very soluble in water may be most conveniently identified by the insoluble chlorin derivative before referred to formed by the action of phosphorous pentachlorid on the dry sodium salt.

The new sulfonated toluylic aldehyde obtained according to the present invention may, as hereinbefore mentioned, be condensed with aromatic amins under the conditions usually employed in the manufacture of similar condensation products or under other suitable conditions in order to obtain coloring-matters of great value. For example, by condensing the new sulfonated toluylic aldehyde with dimethylanilin under conditions such as are ordinarily employed for similar condensation products and oxidizing the resulting leuco compound an excellent yield of a bluish-green coloring-matter fast to alkalies is obtained. I do not, however, make any claim in the present application to the manufacture of such condensation products of the new sulfonated toluylic aldehyde, as such manufacture constitutes the subject of a separate application for patent filed by me—namely, Serial No. 65,050, filed June 18, 1901.

What I claim, and desire to secure by Letters Patent, is—

1. The manufacture of ortho-sulfonated meta-toluylic aldehyde by reacting upon meta-toluylic aldehyde with sulfonating agents.

2. The manufacture of ortho-sulfonated meta-toluylic aldehyde by reacting upon meta-toluylic aldehyde with sulfuric acid containing sixty per cent. anhydride at a relatively low temperature.

3. As a new article of manufacture, ortho-sulfonated toluylic aldehyde obtained by the sulfonation of meta-toluylic aldehyde and having the composition $C_8H_8SO_4$, being an acid crystalline substance very soluble in water and combining with alkalies or alkali earths to form neutral salts also soluble in water and which when the sodium salt is acted upon by phosphorous pentachlorid affords a chlorin derivative insoluble in water, which derivative can be recrystallized from alcohol and melts at about 109° centigrade.

In witness whereof I have hereunto signed my name in the presence of two subscribing witnesses.

JOSEPH KOETSCHET.

Witnesses:
 WILHELM ROTH,
 MARIN NACHON.